United States Patent [19]
Yoshida et al.

[11] Patent Number: 5,942,580
[45] Date of Patent: Aug. 24, 1999

[54] ACRYLIC RUBBER COMPOSITION

[75] Inventors: Tamotsu Yoshida; Jun Okabe, both of Kitaibaraki, Japan

[73] Assignee: Nippon Mektron, Limited, Tokyo, Japan

[21] Appl. No.: 08/610,948

[22] Filed: Mar. 5, 1996

[30]     Foreign Application Priority Data

| Apr. 21, 1995 | [JP] | Japan | 7-120840 |
| Apr. 26, 1995 | [JP] | Japan | 7-125895 |
| Apr. 26, 1995 | [JP] | Japan | 7-125896 |
| Apr. 26, 1995 | [JP] | Japan | 7-125897 |
| Apr. 26, 1995 | [JP] | Japan | 7-125898 |

[51] Int. Cl.$^6$ ................................ C08L 33/16
[52] U.S. Cl. .............. 525/302; 525/298; 525/301; 525/304; 525/312; 525/313; 525/319; 525/320
[58] Field of Search ................. 525/319, 320, 525/301, 298, 292, 304, 312, 313, 302

[56]     References Cited

U.S. PATENT DOCUMENTS

| 4,792,581 | 12/1988 | Kondo | 524/523 |
| 4,908,400 | 3/1990 | Hirose | 524/303 |
| 5,262,479 | 11/1993 | Tobing | 525/71 |
| 5,300,582 | 4/1994 | Debier | 525/314 |

FOREIGN PATENT DOCUMENTS

| 39-20515 | 6/1962 | Japan . |
| 48-24019 | 7/1973 | Japan . |
| 63-264612 | 11/1988 | Japan . |
| 1-123809 | 5/1989 | Japan . |
| 4142356 | 10/1990 | Japan . |
| 3-31351 | 2/1991 | Japan . |
| 4-142356 | 5/1992 | Japan . |

*Primary Examiner*—Fred Zitomer
*Attorney, Agent, or Firm*—Kenyon & Kenyon

[57]     ABSTRACT

An acrylic rubber composition comprising a halogen-containing acrylic rubber, a vulcanizing agent and at least one unsaturated compound selected from the group consisting of (1) α-olefins having at least 4 carbon atoms, (2) carboxylic acid vinyl esters, (3) alkyl vinyl ethers, (4) lower alkyl cyclohexenes or cyclohexenecarboxylic acid caprolactone esters and (5) unsaturated dicarboxylic acid diesters can give vulcanization products having an improved compression set without any substantial deterioration of normal state physical properties and resistance to heat ageing of the vulcanization products, where the unsaturated compound gives off no unpleaseant odor without any skin irritation when vulcanized and without lowering the mold releasability.

10 Claims, No Drawings

ACRYLIC RUBBER COMPOSITION

BACKGROUND OF THE INVENTION

1. Field of the Invention

The present invention relates to an acrylic rubber composition, and more particularly to an acrylic rubber composition capable of giving vulcanization products having an improved compression set.

2. Related Prior Art

Known typical vulcanizable, halogen-containing acrylic rubber systems are those based on polyamine or its carbamate. The resulting vulcanization products still have such disadvantages as a poor compression set and a poor resistance to heat ageing. To improve these disadvantages, it was proposed to copolymerize acrylic rubber with a cross-linking site monomer containing an active halogen such as vinyl chloroacetate, etc. (JP-B-39-20515).

Such known active halogen-containing acrylic rubber vulcanizable systems contain a vulcanizer system of fatty acid alkali metal salt/sulfur or a vulcanizer system of trithiocyanuric acid/alkyldithiocarbamic acid metal salt. The former vulcanizer system can give vulcanization products having good normal state physical properties and a good resistance to heat ageing, but a poor compression set. Thus, the latter vulcanizer system capable of giving vulcanization products having a good compression set has been practically used up to now as a leading vulcanizer system for use in the vulcanization molding of O-rings, gaskets, etc. requiring a good compression set.

However, the vulcanizer system of trithiocyanuric acid/alkyldithiocarbamic acid metal salt still has the following problems, one of which is generation of unpleasant odor from alkyldithiocarbamic acid metal salt during the vulcanization. Furthermore, in the rubber molding and processing fields, a shift from the now leading press molding to the injection molding is under way to increase the productivity, but this vulcanizer system has a problem of poor injection moldability.

To improve the poor compression set of the vulcanizer system of fatty acid alkali metal salt/sulfur capable of giving vulcanization products having good normal state physical properties, a good resistance to heat ageing and having a good injection moldability without generation of unpleasant odor, on the other hand, it was proposed to incorporate an N-substituted bismaleimide into the vulcanizer system (JP-B-48-24019). The proposed vulcanizer system has an improved compression set indeed, but has too high a vulcanization rate and a cross-linking density, resulting in deterioration of breaking strength, (stress strength at break) breaking elongation, (elongation at break) etc.

It was also proposed to add an unsaturated monocarboxylic acid ester such as acrylic acid esters to the vulcanizer system of fatty acid alkali metal salt/sulfur (JP-A-3-31351). However, the acrylic acid esters have problems not only of generation of unpleasant odor and skin irritation during the kneading or vulcanization, but also of considerably retarded vulcanization and lowered modulus or breaking strength, and derioration of mold releasability due to the retarded vulcanization.

Furthermore, it was proposed to add a thioether compound to the vulcanizer system (JP-A-4-142356). Generally, the resistance to heat ageing of acrylic rubber is connected to a brittling tendency and only available effective antioxidants for relieving the brittling tendency are specific amine-based antioxidants. Thus, even use of a thioether compound in place of the amine-based antioxidant inevitably gives vulcanization products having a poor resistance to heat ageing.

SUMMARY OF THE INVENTION

An object of the present invention is to provide a halogen-containing acrylic rubber composition capable of giving vulcanization products having an improved compression set without substantial deterioration of normal state physical properties, a resistance to heat ageing, etc.

Another object of the present invention is to provide a halogen-containing acrylic rubber composition without generation of unpleasant odor or skin irritation and without lowering of mold releasability during the vulcanization or molding.

According to the present invention, there is provided an acrylic rubber composition which comprises a halogen-containing acrylic rubber, a vulcanizing agent and at least one unsaturated compound selected from the group consisting of (1) α-olefins having at least 4 carbon atoms, (2) carboxylic acid vinyl esters, (3) alkyl vinyl ethers, (4) lower alkyl cyclohexenes or cyclohexenecarboxylic acid caprolactone esters and (5) unsaturated dicarboxylic acid diesters.

DETAILED DESCRIPTION OF THE INVENTION

Halogen-containing acrylic rubber for use in the present invention includes, for example, copolymers of at least one main component selected from alkyl, acrylate, alkoxyalkyl acrylate, alkylthioalkyl acrylate, cyanoalkyl acrylate, etc. in an amount of about 60 to about 99.8% by weight on the basis of total copolymer, copolymerized with about 0.1 to about 10% by weight, preferably about 1 to about 5% by weight, of at least one cross-linking site, halogen-containing monomer selected from (1) 2-chloroethyl vinyl ether, 2-chloroethyl acrylate and vinyl benzyl chloride, (2) vinyl chloroacetate and allyl chloroacetate, (3) addition reaction products of a glycidyl compound such as glycidyl acrylate, glycidyl methacrylate, allyl glycidyl ether, etc. with monochloroacetic acid and (4) alkenyl esters of α- or β-halogen-substituted aliphatic monocarboxylic acids; haloalkyl esters, haloalkyl alkenyl esters, haloalkyl alkenyl ketones and haloacetoxyalkyl esters of (meth)acrylic acid; and haloacetyl-containing unsaturated compounds. The copolymers can contain not more than about 30% by weight of other ordinary vinyl compounds as copolymerized therein. Acrylic copolymers containing lactone-modified acrylate (JP-A-63-264612) or terminal cyanolactone-modified acrylate (JP-A-1-123809), or the like, as copolymerized therein, can be also used in the present invention.

Furthermore, halogen- and carboxyl-containing acrylic rubber, for example, the above-mentioned halogen-containing acrylic rubber further containing about 0.1 to about 10% by weight, preferably about 1 to about 5% by weight, of an unsaturated monocarboxylic acid such as acrylic acid, methacrylic acid, maleic acid, etc. or an unsaturated dicarboxylic acid monoester such as mono lower alkyl maleate, etc., as copolymerized therein, can be used in the present invention as the halogen-containing acrylic rubber.

These halogen-containing acrylic rubbers can be vulcanized preferably with the following vulcanizer systems:

(a) Vulcanizer system of aliphatic acid alkali metal salt/sulfur:

Aliphatic acid alkali metal salts include lithium salts, potassium salts, sodium salts, etc. of saturated fatty acids having 1 to 18 carbon atoms, unsaturated fatty acids having 3 to 18 carbon atoms, aliphatic dicarboxylic acids, aromatic dicarboxy acids, etc. and more specifically include, for example, potassium stearate, sodium stearate, potassium oleate, sodium oleate, sodium 2-ethylhexanoate, sodium potassium tartrate, sodium propionate, sodium acetate, etc. Particularly preferable are sodium or potassium salts of fatty acids having 8 to 18 carbon atoms. Potassium salts generally have a tendency to accelerate the vulcanization rate.

(b) Vulcanizer system of trithiocyanuric acid/aliphatic acid alkali metal salt:

The same aliphatic acid alkali metal salts as mentioned in the above item (a) can be used in this vulcanizer system.

(c) Vulcanizer system of diamine or its carbamate/dibasic lead phosphite:

Hexamethylenediamine or its carbamate is preferably used as the diamine or its carbamate.

Besides, the following vulcanizer sysrtems can be also used:

(d) Vulcanizer system of trithiocyanuric acid/ dicyandiamide/dibasic lead phosphite (e) Vulcanizer system of trithiocyanuric acid/ dicyandiamide/metal oxide (f) Vulcanizer system of trithiocyanuric acid/ dicyandiamide/aluminum-containing compound (g) Vulcanizer system of trithiocyanuric acid/ dicyandiamide/aliphatic acid alkaline earth metal salt or zinc salt (h) Vulcanizer system of trithiocyanuric acid/metal dithiocarbamate/thiuram sulfide (i) Vulcanizer system of trithiocyanuric acid/metal dithiocarbamate/quaternary ammonium or phosphonium salt (j) Vulcanizer system of trithiocyanuric acid/trimethylthiourea/metal oxide (k) Vulcanizer system of trithiocyanuric acid/aliphatic acid alkaline earth metal salt or zinc salt Usually about 0.1 to about 10 parts by weight, preferably about 0.2 to about 1 parts by weight or about 1 to about 5 parts by weight, depending on vulcanizer components and their combination, of one of these vulcanizer systems is used per 100 parts by weight of the halogen-containing acrylic rubber.

The present acrylic rubber composition comprising the above-mentioned halogen-containing acrylic rubber and vulcanizing agent contains at least one unsaturated compound selected from the group consisting of the following compounds (1) to (5):

(1) α-olefins having at least 4 carbon atoms:

α-olefins having at least 4 carbon atoms, usually 4 to 30 carbon atoms and preferably 6 to 20 carbon atoms, where the α-olefins are in a liquid state, are used. Generally, α-olefins having such carbon atoms are oligomers obtainable as low-molecular weight polymers of ethylene monomer and are mixtures of oligomers having various degree of polymerization. In the present invention, α-olefins are used as such, or are used as α-olefins having a narrow distribution of carbon atoms on purification. α-olefins having less than 4 carbon atoms have too low a boiling point and are dissipated during the vulcanization. That is, the effect is reduced by half. On the other hand, α-olefins having a longer carbon chain are in a wax state and are hard to handle. Sometimes, α-olefins contain branched olefins, internal olefins or saturated hydrocarbons, but can be used as such without any trouble.

About 0.1 to about 30 parts by weight of at least one of these α-olefins is used per 100 parts by weight of halogen-containing acrylic rubber. In case of application to vulcanization products requiring a low compression set such as O-rings, gaskets, etc., about 1 to about 3 parts by weight of the α-olefins is used per 100 parts by weight of the halogen-containing acrylic rubber. In case of application to hose materials, etc., even about 10 to about 30 parts by weight of the α-olefins can be used together with various plasticizers whereby the compression set can be effectively improved. The use of α-olefins have no such problems of unpleasant odor or skin irritation during the vulcanization as encountered in the case of acrylic acid ester and also have no mold releasability problem.

(2) Carboxylic acid vinyl esters:

Carboxylic acid vinyl esters for use in the present invention can be represented by the general formula $RCOOCH=CH_2$, where R is an alkyl group having 1 to 20 carbon atoms, preferably 3 to 13 carbon atoms or an aryl group, and the alkyl group or aryl group may take a substituent group such as cyano group, alkoxy group, etc. Such carboxylic acid vinyl esters include, for example, vinyl acetate, vinyl propionate, vinyl butyrate, vinyl caproate, vinyl caprylate, vinyl caprate, vinyl laurate, vinyl myristate, vinyl palmitate, vinyl stearate, vinyl cyanoacetate, vinyl benzoate, etc.

About 0.1 to about 30 parts by weight of at least one of these carboxylic acid vinyl esters is used per 100 parts by weight of halogen-containing acrylic rubber. In case of application to vulcanization products requiring a low compression set such as O-rings, gaskets, etc., about 1 to about 3 parts by weight of the carboxylic acid vinyl esters is used per 100 parts by weight of the halogen-containing acrylic rubber. In case of application to hose materials, etc., even about 10 to about 30 parts by weight of the carboxylic acid vinyl esters can be used together with various plasticizers, whereby the compression set can be effectively improved. The use of carboxylic acid vinyl esters have no such problems of unpleasant odor or skin irritation during the vulcanization as encountered in the case of acrylic acid ester and also have no mold releasability problem.

(3) Alkyl vinyl ethers:

Alkyl vinyl ethers for use in the present invention are those represented by the general formula $ROCH=CH_2$ where R is an alkyl group having 3 to 18 carbon atoms, preferably 5 to 18 carbon atoms. Alkyl vinyl ethers having an alkyl group having less than 3 carbon atoms have too low a boiling point and are dissipated during the vulcanization. That is, the effect is reduced by half. The alkyl group may further have such a substituent as alkoxy group, etc. The alkyl vinyl ether for use in the present invention includes, for example, n-propyl vinyl ether, isopropyl vinyl ether, n-butyl vinyl ether, isobutyl vinyl ether, t-butyl vinyl ether, n-amyl vinyl ether, isoamyl vinyl ether, 2-ethylhexyl vinyl ether, n-octadecyl vinyl ether, etc.

About 0.1 to about 30 parts by weight of at least one of these alkyl vinyl ethers is used per 100 parts by weight of halogen-containing acrylic rubber. In case of application to vulcanization products requiring a low compression set such as O-rings, gaskets, etc., about 1 to about 3 parts by weight of the alkyl vinyl ethers is used per 100 parts by weight of the halogen-containing acrylic rubber. In case of application to hose materials, etc., even about 10 to about 30 parts by weight of the alkyl vinyl ethers can be used together with various plasticizers, whereby the compression set can be effectively improved. The use of alkyl vinyl ethers have no such problems of unpleasant odor or skin irritation during the vulcanization as encountered in the case of acrylic acid esters and also have no mold releasability problem.

(4) Lower alkyl cyclohexenes or cyclohexenecarboxylic acid caprolactone esters:

Lower alkyl cyclohexenes for use in the present invention are cyclohexenes, at least one of whose hydrogen atoms at the 3-, 4-, 5- or 6- positions excluding the unsaturated bond is replaced with a lower alkyl group. The lower alkyl group may further have a lower alkoxy group, etc. as substituents, that is, it may be a lower alkoxy-lower alkyl group, etc. The lower alkyl cyclohexenes include, for example, methylcyclohexene, dimethylcyclohexene, ethylcyclohexene, n-propylcyclohexene, isopropylcyclohexene, n-butylcyclohexene, isobutylcyclohexene, t-buty lcyclohexene, etc. Position of substitution for the lower alkyl group can be any one of 3- to 6-positions. Cyclohexenecarboxylic acid caprolactone esters for use in the present invention include cyclohexenes having a caprolactone ester group represented by the following general formula at the 3-position:

—COO[(CH$_2$ )$_5$COO]$n$CH$_2$R where R is an alkyl group having 1 to 8 carbon atoms, an alkoxyl group, an alkoxyalkyl group or a cyclohexenyl group and n is an integer of 1 to 5.

About 0.1 to about 30 parts by weight of at least one of these lower alkylcyclohexenes or cyclohexenecarboxylic acid caprolactone esters is used per 100 parts by weight of halogen-containing acrylic rubber. In case of application to vulcanization products requiring a low compression set such as O-rings, gaskets, etc., about 1 to about 3 parts by weight of the lower alkylcyclohexenes or cyclohexenecarboxylic acid caprolactone esters is used per 100 parts by weight of the halogen-containing acrylic rubber. In case of application to hose materials, etc., even about 10 to about 30 parts by weight of the lower alkyl cyclohexenes or cyclohexenecarboxylic acid caprolactone esters can be used together with various plasticizers, whereby the compression set can be effectively improved. The use of lower alkyl cyclohexenes or cyclohexenecarboxylic acid caprolactone esters have no such problems of unpleasant odor or skin irritation during the vulcanization as encountered in the case of acrylic acid esters and also have no mold releasability problem.

(5) Unsaturated dicarboxylic acid diesters:

Unsaturated dicarboxylic acid diesters for use in the present invention are diesters of unsaturated dicarboxylic acids such as maleic acid, fumaric acid, itaconic acid, etc., with two alkyl groups or two alkenyl groups, each having 1 to 10 carbon atoms, that is, such as dialkyls or dialkenyls as dimethyl, diethyl, dipropyl, diisopropyl, di-n-butyl, diisobutyl, di-t-butyl, di-2-ethylhexyl, dioctyl, diallyl, etc. The diesters usually have the same ester groups, but can have mutually different ester groups. The alkyl groups may be alkoxy-substituted alkyl groups, such as methoxymethyl group, ethoxymethyl group, methoxyethyl group and ethoxyethyl group.

About 0.1 to about 30 parts by weight of at least one of these unsaturated dicarboxylic acid diesters is used per 100 parts by weight of halogen-containing acrylic rubber. In case of application to vulcanization products requiring a low compression set such as O-rings, gaskets, etc., about 1 to about 3 parts by weight of the unsaturated dicarboxylic acid diesters is used per 100 parts by weight of the halogen-containing acrylic rubber. In case of application to hose materials, etc., even about 10 to about 30 parts by weight of the unsaturated dicarboxylic acid diesters can be used together with various plasticizers, whereby the compression set can be effectively improved. Unsaturated dicarboxylic acid diesters have higher molecular weights and boiling points than those of acrylic acid esters and thus have no such problems of unpleasant odor or skin irritation during the vulcanization as encountered in the case of acrylic acid esters and also have no mold releasability problem.

The halogen-containing acrylic rubber composition comprising the above-mentioned essential components can further contain other necessary additives such as a filler, a reinforcing agent, a vulcanization acid, a lubricant, etc. when desired. For example, in case of application to vulcanization-molding materials for various sealing materials, the composition can contain carbon black for the O-ring and packing purposes, and can contain diatomaceous earth, white carbon, etc. for the oil seal purpose.

The present composition can be prepared in a closed type kneader such as a kneader and a Bumbury mixer or in an open-type kneader such as an open roll, and its vulcanization can be carried out usually by press vulcanization or injection molding vulcanization at a temperature of about 150 to about 250° C. for about 1 to about 30 minutes, and if required, secondary vulcanization can be carried out by oven vulcanization or steam vulcanization at a temperature of about 150 to about 200° C. for about 1 to about 22 hours.

Compression set of vulcanization products can be improved without any substantial deterioration of normal state physical properties or resistance to heat ageing by adding at least one unsaturated compound selected from the group consisting of (1) α-olefins having at least 4 carbon atoms, (2) carboxylic acid vinyl esters, (3) alkyl vinyl ethers, (4) lower alkyl cyclohexenes or cyclohexenecarboxylic acid caprolactone esters and (5) unsaturated dicarboxylic acid diesters to a composition comprising a halogen-containing acrylic rubber and a vulcanizing agent. These specific unsaturated cmpounds, as added, give off no unpleasant odor without any skin during the vulcanization and without lowering the mold releasability.

PREFERRED EMBODIMENTS OF THE INVENTION

The present invention will be described in detail below, referring to Examples.

EXAMPLE 1 TO 12

Acrylic rubber compositions were prepared from polymers A to D having monomer compositions (% by weight) given in the following Table 1, according to formulations (parts by weight) given in the following Table 2 by kneading in an 8-inch open roll.

TABLE 1

| Comonomer£olymer | A | B | C | D | E |
|---|---|---|---|---|---|
| Ethyl acrylate | 98 | 48 | 95 | 48 | |
| Butyl acrylate | | 25 | | 25 | 50 |
| 2-methoxyethyl acrylate | | 25 | | 25 | 48 |
| Vinyl chloroacetate | 2 | 2 | | | 2 |
| 2-chloroethyl vinyl ether | | | 5 | | |
| Chloromethylstyrene | | | | 2 | |

TABLE 2

| | Ex. 1 | Ex. 2 | Ex. 3 | Ex. 4 | Ex. 5 | Ex. 6 |
|---|---|---|---|---|---|---|
| Polymer A | 100 | | | | | |
| Polymer B | | 100 | 100 | | | |
| Polymer C | | | | 100 | 100 | |
| Polymer D | | | | | | 100 |
| HAF carbon black (N330) | 50 | 60 | | 50 | 50 | 60 |
| FEF carbon black (N550) | | | 65 | | | |
| Stearic acid | 1 | 1 | 1 | 1 | 1 | 1 |
| 4,4'-(α,α-dimethylbenzyl)- | 2 | 2 | 2 | 2 | 2 | 2 |

TABLE 2-continued

|  | Ex. 1 | Ex. 2 | Ex. 3 | Ex. 4 | Ex. 5 | Ex. 6 |
|---|---|---|---|---|---|---|
| diphenylamine*1 |  |  |  |  |  |  |
| Plasticizer |  |  | 10 |  |  |  |
| (Fatty acid metal salt)*2 |  |  |  |  |  |  |
| Sodium stearate | 2.5 | 3 | 2.5 |  | 3 | 3 |
| Potassium stearate | 0.25 | 0.25 | 0.5 |  |  |  |
| Sulfur | 0.3 | 0.3 | 0.3 |  |  |  |
| Tricyanuric acid |  |  |  |  | 0.6 | 0.6 |
| Dibasic lead phosphite |  |  |  | 3 |  |  |
| Hexamethylenediamine carbamate*3 |  |  |  | 0.75 |  |  |
| Hexene*4 | 2 | 2 | 2 | 2 | 2 | 2 |

Remarks
*1Nocrack CD, trademark of an antioxidant made by Ouchi-Shinko Kagaku K. K., Japan
*2TE-80, trademark of a plasticizer made by Technical Processing Company
*3Cheminox AC-6, trademark of a vulcanizer made by Nippon Mektron K. K., Japan
*4Dialene 6, trademark of hexene ($C_6$: more than 99%), made by Mitsubishi Kagaku K. K., Japan The thus obtained compositions were subjected to measurement of Mooney viscosity and scorch time according to JIS K-6300. Furthermore, the compositions were subjected to press vulcanization at 180° C. for 8 minutes and then to oven vulcanization at 175° C. for 4 hours, and the resulting vulcanization products were subjected to determination of normal state physical properties, resistance to heat ageing and compression set according to JIS K-6301. Test conditions for the resistance to heat ageing were 175° C. for 70 hours and those for the compression set were 150° C., for 70 hours. Results of determination are shown in the following Table 3.

TABLE 3

|  | Ex. 1 | Ex. 2 | Ex. 3 | Ex. 4 | Ex. 5 | Ex. 6 |
|---|---|---|---|---|---|---|
| <Properties of unvulcanized compositions> |  |  |  |  |  |  |
| Mooney viscosity ($ML_{1+4}$, M) | 56 | 54 | 37 | 52 | 44 | 45 |
| Scorch time (min.) | 19.9 | 10.8 | 8.9 | 25.0 | 17.3 | 12.4 |
| <Vulcanization product properties> |  |  |  |  |  |  |
| Normal state physical properties |  |  |  |  |  |  |
| Hardness (JIS-A, pts) | 72 | 69 | 58 | 72 | 70 | 70 |
| 100% Modulus (kg/cm$^2$) | 49 | 52 | 37 | 47 | 41 | 48 |
| Breaking strength (kg/cm$^2$) | 160 | 148 | 110 | 130 | 154 | 150 |
| Breaking elongation (%) | 320 | 270 | 280 | 240 | 330 | 260 |
| Resistance to heat ageing |  |  |  |  |  |  |
| Hardness change (%) | +9 | +9 | +5 | +10 | +6 | +6 |
| Modulus change (%) | −11 | +8 | −6 | +15 | +14 | +13 |
| Breaking strength change (%) | −11 | −5 | −6 | −6 | 0 | −2 |
| Breaking elongation change (%) | −6 | +1 | −8 | −5 | −8 | −8 |
| Compression set (%) | 22 | 21 | 32 | 32 | 20 | 21 |
| <Other influences of unsaturated compounds> |  |  |  |  |  |  |
| Unpleasant odor | none | none | none | none | none | none |
| Skin irritation | none | none | none | none | none | none |
| Deterioration of mold releasability | none | none | none | none | none | none |

Acrylic rubber compositions were prepared from polymers E given in the foregoing Table 1, according to formulations given in the following Table 4 by kneading in an 8-inch open roll.

TABLE 4

|  | Ex. 7 | Ex. 8 | Ex. 9 | Ex. 10 | Ex. 11 | Ex. 12 |
|---|---|---|---|---|---|---|
| Polymer E | 100 | 100 | 100 | 100 | 100 | 100 |
| HAF carbon black (N330) | 60 | 60 | 60 | 60 | 60 |  |
| FEF carbon black (N550) |  |  |  |  |  | 60 |
| Stearic acid | 1 | 1 | 1 | 1 | 1 | 1 |
| 4,4'-(α,α-dimethylbenzyl)-diphenylamine | 2 | 2 | 2 | 2 | 2 | 2 |
| Sodium stearate | 3 | 3 | 3 | 3 | 3 | 3 |
| Potassium stearate | 0.25 | 0.25 | 0.25 | 0.25 | 0.25 | 0.25 |
| Sulfur | 0.3 | 0.3 | 0.3 | 0.3 | 0.3 | 0.3 |
| Octadecene*5 | 2 |  |  |  |  |  |
| Hexene |  | 2 |  | 0.5 | 5 | 2 |
| α-Olefin*6 |  |  | 2 |  |  |  |

Remarks
*5Dialene 18 ($C_{18}$: more than 97%), trademark of a product made by Mitsubishi Kagaku K. K., Japan
*4Dialene 30 ($C_{30}$: more than 95%), trademark of a product made by Mitsubishi Kagaku K. K., Japan Properties of the thus obtained unvulcanized compositions and properties, resistance to heat ageing and compression set of the resulting vulcanization products were determined in the same manner as in Examples 1 to 6. Results of determination are given in the following Table 5.

TABLE 5

|  | Ex. 7 | Ex. 8 | Ex. 9 | Ex. 10 | Ex. 11 | Ex. 12 |
|---|---|---|---|---|---|---|
| <Properties of unvulcanized compositions> |  |  |  |  |  |  |
| Mooney viscosity ($ML_{1+4}$, M) | 51 | 49 | 48 | 53 | 40 | 46 |
| Scorch time (min.) | 20.0 | 18.9 | 19.9 | 18.8 | 19.7 | 20.0 |
| <Vulcanization product properties> |  |  |  |  |  |  |
| Normal state physical properties |  |  |  |  |  |  |
| Hardness (JIS-A, pts) | 67 | 62 | 66 | 68 | 66 | 63 |
| 100% Modulus (kg/cm$^2$) | 60 | 55 | 61 | 68 | 52 | 63 |
| Breaking strength (kg/cm$^2$) | 144 | 144 | 144 | 145 | 145 | 129 |
| Breaking elongation (%) | 220 | 220 | 210 | 190 | 240 | 180 |
| Resistance to heat ageing |  |  |  |  |  |  |
| Hardness change (%) | +10 | +15 | +12 | +10 | +12 | +7 |
| Modulus change (%) | +1 | +2 | +7 | −12 | +8 | −10 |
| Breaking strength change (%) | −7 | −9 | −5 | −5 | −7 | −8 |
| Breaking elongation change (%) | −5 | −5 | 0 | +11 | −12 | +6 |
| Compression set (%) | 19 | 20 | 20 | 24 | 21 | 16 |
| <Other influences of unsaturated compounds> |  |  |  |  |  |  |
| Unpleasant odor | none | none | none | none | none | none |
| Skin irritation | none | none | none | none | none | none |
| Deterioration of mold releasability | none | none | none | none | none | none |

EXAMPLES 13 TO 24

Acrylic rubber compositions were prepared from the same polymers A to D according to the same formulations as in Example 1 to 6, except that the same amount of vinyl acetate was used in place of hexene, by kneading in an 8-inch open roll. Properties of unvulcanized compositions and properties, resistance to heat ageing and compression set of the resulting vulcanization products were determined in the same manner as in Examples 1 to 6. Results of determination are given in the following Table 6.

TABLE 6

|  | Ex. 13 | Ex. 14 | Ex. 15 | Ex. 16 | Ex. 17 | Ex. 18 |
|---|---|---|---|---|---|---|
| <Properties of unvulcanized compositions> | | | | | | |
| Mooney viscosity ($ML_{1+4}$, M) | 54 | 57 | 38 | 52 | 43 | 44 |
| Scorch time (min.) | 19.0 | 10.4 | 8.9 | 23.4 | 17.2 | 12.3 |
| <Vulcanization product properties> | | | | | | |
| Normal state physical properties | | | | | | |
| Hardness (JIS-A, pts) | 70 | 71 | 56 | 72 | 71 | 70 |
| 100% Modulus ($kg/cm^2$) | 48 | 53 | 38 | 44 | 41 | 50 |
| Breaking strength ($kg/cm^2$) | 159 | 148 | 111 | 129 | 152 | 153 |
| Breaking elongation (%) | 320 | 280 | 270 | 240 | 330 | 270 |
| Resistance to heat ageing | | | | | | |
| Hardness change (%) | +9 | +9 | +5 | +7 | +5 | +6 |
| Modulus change (%) | −12 | +2 | −12 | +8 | +8 | +7 |
| Breaking strength change (%) | −10 | −6 | −6 | −5 | −4 | +1 |
| Breaking elongation change (%) | −5 | +3 | −8 | −5 | −7 | −8 |
| Compression set (%) | 24 | 25 | 34 | 36 | 25 | 22 |
| <Other influences of unsaturated compounds> | | | | | | |
| Deterioration of mold releasability | none | none | none | none | none | none |

Acrylic rubber compositions were prepared from the same polymer E according to the same formulations as in Examples 7 to 12, except that the octadecene was replaced with the same amount of vinyl laurate, the hexene with the same amount of vinyl acetate and the α-olefin with the same amount of vinyl pivalate, by kneading in an 8-inch open roll. Properties of the thus obtained unvulcanized compositions and properties, resistance to heat ageing and compression set of the resulting vulcanization products were determined in the same manner as in Examples 1 to 6. Results of determination are shown in the following Table 7.

TABLE 7

|  | Ex. 19 | Ex. 20 | Ex. 21 | Ex. 22 | Ex. 23 | Ex. 24 |
|---|---|---|---|---|---|---|
| <Properties of unvulcanized composition> | | | | | | |
| Mooney viscosity ($ML_{1+4}$, M) | 50 | 50 | 49 | 54 | 42 | 45 |
| Scorch time (min.) | 20.3 | 19.2 | 18.9 | 19.4 | 20.8 | 19.4 |
| <Vulcanization product properties> | | | | | | |
| Normal state physical properties | | | | | | |
| Hardness (JIS-A, pts) | 67 | 64 | 66 | 68 | 65 | 65 |
| 100% Modulus ($kg/cm^2$) | 57 | 56 | 62 | 66 | 52 | 61 |
| Breaking strength ($kg/cm^2$) | 144 | 143 | 144 | 147 | 145 | 130 |
| Breaking elongation (%) | 220 | 220 | 210 | 170 | 230 | 180 |
| Resistance to heat ageing | | | | | | |
| Hardness change (%) | +7 | +13 | +10 | +8 | +10 | +5 |
| Modulus change (%) | −4 | −4 | +3 | −16 | +4 | −16 |
| Breaking strength change (%) | −7 | −8 | −6 | −3 | −7 | −8 |
| Breaking elongation change (%) | −2 | −4 | −1 | +12 | −10 | +8 |

TABLE 7-continued

|  | Ex. 19 | Ex. 20 | Ex. 21 | Ex. 22 | Ex. 23 | Ex. 24 |
|---|---|---|---|---|---|---|
| Compression set (%) | 22 | 22 | 23 | 26 | 23 | 21 |
| <Other influences of unsaturated compounds> | | | | | | |
| Deterioration of mold releasability | none | none | none | none | none | none |

EXAMPLES 25 TO 36

Acrylic rubber compositions were prepared from the same polymers A to D according to the same formulations as in Example 1 to 6, except that the hexene was replaced with the same amount of n-amyl vinyl ether, by kneading in an 8-inch open roll. Properties of the thus obtained unvulcanized compositions and properties, resistance to heat ageing and compression set of the resulting vulcanization products were determined in the same manner as in Examples 1 to 6. Results of determination are shown in the following Table 8.

TABLE 8

|  | Ex. 25 | Ex. 26 | Ex. 27 | Ex. 28 | Ex. 29 | Ex. 30 |
|---|---|---|---|---|---|---|
| <Properties of unvulcanized compositions> | | | | | | |
| Mooney viscosity ($ML_{1+4}$, M) | 55 | 56 | 36 | 51 | 44 | 45 |
| Scorch time (min.) | 18.7 | 10.3 | 9.0 | 23.0 | 16.0 | 13.2 |
| <Vulcanization product properties> | | | | | | |
| Normal state physical properties | | | | | | |
| Hardness (JIS-A, pts) | 71 | 70 | 57 | 73 | 71 | 70 |
| 100% Modulus ($kg/cm^2$) | 48 | 52 | 36 | 45 | 42 | 49 |
| Breaking strength ($kg/cm^2$) | 160 | 148 | 109 | 129 | 153 | 152 |
| Breaking elongation (%) | 330 | 280 | 270 | 250 | 320 | 270 |
| Resistance to heat ageing | | | | | | |
| Hardness change (%) | +8 | +9 | +4 | +7 | +5 | +4 |
| Modulus change (%) | −13 | +2 | −12 | +9 | +8 | +7 |
| Breaking strength change (%) | −10 | −6 | −6 | −6 | −4 | +1 |
| Breaking elongation change (%) | −5 | +3 | −9 | −5 | −7 | −8 |
| Compression set (%) | 24 | 24 | 35 | 35 | 24 | 23 |
| <Other influences of unsaturated compounds> | | | | | | |
| Skin irritation | none | none | none | none | none | none |
| Deterioration of mold releasability | none | none | none | none | none | none |

Acrylic rubber compositions were prepared from the same polymer E according to the same formulations as in Examples 7 to 12, except that the octadecene was replaced with the same amount of n-octadecyl vinyl ether, the hexene with the same amount of n-amyl vinyl ether and the α-olefin with the same amount of n-isoamyl vinyl ether, by kneading in an 8-inch open roll. Properties of the thus obtained unvulcanized compositions and properties, resistance to heat ageing and compression set of the resulting vulcanization products were determined in the same manner as in Examples 1 to 6. Results of determination are given in the following Table 9.

TABLE 9

|  | Ex. 31 | Ex. 32 | Ex. 33 | Ex. 34 | Ex. 35 | Ex. 36 |
|---|---|---|---|---|---|---|
| <Properties of unvulcanized compositions> | | | | | | |
| Mooney viscosity ($ML_{1+4}$, M) | 51 | 49 | 49 | 53 | 41 | 47 |
| Scorch time (min.) | 19.9 | 19.0 | 18.9 | 18.1 | 19.7 | 20.4 |
| <Vulcanization product properties> | | | | | | |
| Normal state physical properties | | | | | | |
| Hardness (JIS-A, pts) | 68 | 63 | 66 | 67 | 65 | 64 |
| 100% Modulus ($kg/cm^2$) | 58 | 56 | 61 | 67 | 53 | 62 |
| Breaking strength ($kg/cm^2$) | 143 | 143 | 145 | 147 | 145 | 132 |
| Breaking elongation (%) | 230 | 220 | 210 | 190 | 230 | 170 |
| Resistance to heat ageing | | | | | | |
| Hardness change (%) | +8 | +13 | +10 | +8 | +11 | +6 |
| Modulus change (%) | −5 | −4 | +3 | −16 | +3 | −16 |
| Breaking strength change (%) | −7 | −8 | −5 | −4 | −7 | −7 |
| Breaking elongation change (%) | −2 | −5 | 0 | +11 | −10 | +8 |
| Compression set (%) | 22 | 23 | 22 | 27 | 24 | 20 |
| <Other influences of unsaturated compounds> | | | | | | |
| Skin irritation | none | none | none | none | none | none |
| Deterioration of mold releasability | none | none | none | none | none | none |

EXAMPLES 37 TO 48

Acrylic rubber compositions were prepared from the same polymers A to D according to the same formulations as in Examples 1 to 6, except that the hexene was replaced with the same amount of 3,6-dimethylcyclohexene, by kneading in an 8-inch open roll. Properties of the thus obtained unvulcanized compositions and properties, resistance to heat ageing and compression set of the resulting vulcanization products were determined in the same manner as in Examples 1 to 6. Results of determination are given in the following Table 10.

TABLE 10

|  | Ex. 37 | Ex. 38 | Ex. 39 | Ex. 40 | Ex. 41 | Ex. 42 |
|---|---|---|---|---|---|---|
| <Properties of unvulcanized compositions> | | | | | | |
| Mooney viscosity ($ML_{1+4}$, M) | 57 | 56 | 40 | 53 | 46 | 46 |
| Scorch time (min.) | 19.9 | 9.8 | 8.7 | 23.7 | 18.2 | 12.2 |
| <Vulcanization product properties> | | | | | | |
| Normal state physical properties | | | | | | |
| Hardness (JIS-A, pts) | 72 | 70 | 60 | 71 | 70 | 72 |
| 100% Modulus ($kg/cm^2$) | 51 | 53 | 39 | 48 | 42 | 50 |
| Breaking strength ($kg/cm^2$) | 161 | 146 | 108 | 132 | 153 | 150 |
| Breaking elongation (%) | 330 | 270 | 290 | 230 | 330 | 250 |
| Resistance to heat ageing | | | | | | |
| Hardness change (%) | +9 | +10 | +5 | +9 | +6 | +7 |
| Modulus change (%) | −10 | +8 | −6 | +15 | +13 | +14 |
| Breaking strength change (%) | −11 | −5 | −4 | −4 | 0 | −3 |
| Breaking elongation change (%) | −6 | +1 | −8 | −4 | −9 | −8 |
| Compression set (%) | 28 | 28 | 36 | 37 | 36 | 27 |
| <Other influences of unsaturated compounds> | | | | | | |
| Unpleasant odor | none | none | none | none | none | none |
| Skin irritation | none | none | none | none | none | none |
| Deterioration of mold releasability | none | none | none | none | none | none |

Acrylic rubber compositions were prepared from the same polymer E according to the same formulations as in Examples 7 to 12, except that the octadecene was replaced with the same amount of 3-methylcyclohexene, the hexene with the same amount of 3,6-dimethylcyclohexene and the α-olefin with the same amount of caprolactone-modified cyclohexene (CLM3, trademark of a product made by Daicel Kagaku K. K., Japan), by kneading in an 8-inch open roll. Properties of the thus prepared compositions and properties, resistance to heat ageing and compression set of the resulting vulcanization products were determined in the same manner as in Examples 1 to 6. Results of determination are given in the following Table 11.

TABLE 11

|  | Ex. 43 | Ex. 44 | Ex. 45 | Ex. 46 | Ex. 47 | Ex. 48 |
|---|---|---|---|---|---|---|
| <Properties of unvulcanized compositions> | | | | | | |
| Mooney viscosity ($ML_{1+4}$, M) | 52 | 50 | 50 | 55 | 43 | 48 |
| Scorch time (min.) | 21.3 | 18.3 | 19.8 | 19.4 | 20.0 | 19.9 |
| <Vulcanization product properties> | | | | | | |
| Normal state physical properties | | | | | | |
| Hardness (JIS-A, pts) | 68 | 63 | 66 | 69 | 68 | 63 |
| 100% Modulus ($kg/cm^2$) | 62 | 55 | 61 | 68 | 53 | 63 |
| Breaking strength ($kg/cm^2$) | 145 | 144 | 144 | 146 | 145 | 129 |
| Breaking elongation (%) | 220 | 210 | 210 | 190 | 230 | 180 |
| Resistance to heat ageing | | | | | | |
| Hardness change (%) | +9 | +14 | +12 | +10 | +11 | +7 |
| Modulus change (%) | +2 | +3 | +5 | −12 | +9 | −11 |
| Breaking strength change (%) | −8 | −9 | −4 | −6 | −7 | −9 |
| Breaking elongation change (%) | −4 | −3 | +1 | +12 | −11 | +6 |
| Compression set (%) | 25 | 26 | 26 | 29 | 27 | 20 |
| <Other influences of unsaturated compounds> | | | | | | |
| Unpleasant odor | none | none | none | none | none | none |
| Skin irritation | none | none | none | none | none | none |
| Deterioration of mold releasability | none | none | none | none | none | none |

EXAMPLES 49 TO 60

Acrylic rubber compositions were prepared from the same polymers A to D according to the same formulations as in Example 1 to 6, except that the hexene was replaced with the same amount of dibutyl fumarate (DEs-2, trademark of a product made by Kurogane Kasei K. K., Japan), by kneading in an 8-inch open roll. Properties of the thus obtained unvulcanized compositions and properties, resistance to heat ageing and compression set of the resulting vulcanization products were determined in the same manner as in Examples 1 to 6. Results of determination are given in the following Table 12.

TABLE 12

|  | Ex. 49 | Ex. 50 | Ex. 51 | Ex. 52 | Ex. 53 | Ex. 54 |
|---|---|---|---|---|---|---|
| <Properties of unvulcanized compositions> | | | | | | |
| Mooney viscosity ($ML_{1+4}$, M) | 51 | 48 | 32 | 45 | 38 | 40 |
| Scorch time (min.) | 19.9 | 11.2 | 9.4 | 24.1 | 17.8 | 12.2 |
| <Vulcanization product properties> | | | | | | |
| Normal state physical properties | | | | | | |
| Hardness (JIS-A, pts) | 68 | 66 | 53 | 68 | 65 | 66 |
| 100% Modulus ($kg/cm^2$) | 45 | 57 | 39 | 44 | 47 | 44 |
| Breaking strength ($kg/cm^2$) | 158 | 148 | 109 | 132 | 152 | 150 |
| Breaking elongation (%) | 340 | 280 | 300 | 250 | 330 | 270 |
| Resistance to heat ageing | | | | | | |
| Hardness change (%) | +11 | +12 | +8 | +13 | +8 | +9 |
| Modulus change (%) | 0 | +16 | +4 | +21 | +22 | +21 |
| Breaking strength change (%) | −20 | −15 | −16 | −17 | −8 | −12 |
| Breaking elongation change (%) | −9 | −2 | −11 | −9 | −10 | −12 |
| Compression set (%) | 22 | 22 | 33 | 32 | 21 | 22 |
| <Other influences of unsaturated compounds> | | | | | | |
| Unpleasant odor | none | none | none | none | none | none |

Acrylic rubber compositions were prepared from the same polymer E according to the same formulations as in Examples 7 to 12, except that the octadecene was replaced with the same amount of dibutyl maleate (DEs-1, trademark of a product made by Kurogane Kasei K. K., Japan), the hexene with the same amount of dibutyl fumarate (DEs-2) and the α-olefin with the same amount of dibutyl itaconate (DEs-3, trademark of a product made by Kurogane Kasei K. K., Japan), by kneading in an 8-inch open roll. Properties of the thus obtained unvulcanized compositions and properties, resistance to heat ageing and compression set of the resulting vulcanization products were determined in the same manner as in Examples 1 to 6. Results of determination are shown in the following Table 13.

TABLE 13

|  | Ex. 55 | Ex. 56 | Ex. 57 | Ex. 58 | Ex. 59 | Ex. 60 |
|---|---|---|---|---|---|---|
| <Properties of unvulcanized compositions> | | | | | | |
| Mooney viscosity ($ML_{1+4}$, M) | 45 | 44 | 46 | 48 | 35 | 40 |
| Scorch time (min.) | 19.5 | 19.9 | 20.1 | 18.3 | 20.3 | 19.9 |
| <Vulcanization product properties> | | | | | | |
| Normal state physical properties | | | | | | |
| Hardness (JIS-A, pts) | 63 | 62 | 62 | 64 | 62 | 58 |
| 100% Modulus ($kg/cm^2$) | 55 | 56 | 54 | 63 | 48 | 58 |
| Breaking strength ($kg/cm^2$) | 144 | 145 | 144 | 144 | 145 | 130 |
| Breaking elongation (%) | 240 | 240 | 250 | 220 | 250 | 210 |
| Resistance to heat ageing | | | | | | |
| Hardness change (%) | +13 | +13 | +12 | +13 | +15 | +10 |
| Modulus change (%) | +10 | +9 | +10 | −4 | +16 | −2 |
| Breaking strength change (%) | −13 | −12 | −13 | −14 | −16 | −16 |

TABLE 13-continued

|  | Ex. 55 | Ex. 56 | Ex. 57 | Ex. 58 | Ex. 59 | Ex. 60 |
|---|---|---|---|---|---|---|
| Breaking elongation change (%) | −8 | −5 | −6 | +7 | −14 | +1 |
| Compression set (%) | 20 | 20 | 21 | 24 | 20 | 16 |
| <Other influences of unsaturated compounds> | | | | | | |
| Unpleasant odor | none | none | none | none | none | none |

COMPARATIVE EXAMPLES 1 TO 3

Acrylic rubber compositions were prepared from the polymer C or D, according to the following formulations given in the following Table 14 by kneading in an 8-inch open roll.

TABLE 14

|  | Comp. Ex. 1 | Comp. Ex. 2 | Comp. Ex. 3 |
|---|---|---|---|
| Polymer C | 100 | 100 | |
| Polymer D | | | 100 |
| HAF carbon black (N330) | 56 | 50 | 60 |
| Stearic acid | 1 | 1 | 1 |
| 4,4'-(α,α-dimethylbenzyl)-diphenylamine | 2 | 2 | 2 |
| Sodium stearate | | 3 | 3 |
| Trithiocyanuric acid | | 0.6 | 0.6 |
| Dibasic lead phosphite | 3 | | |
| Hexamethylenediamine carbamate*[3] | 0.75 | | |

Properties of the thus obtained unvulcanized compositions and properties, resistance to heat ageing and compression set of the resulting vulcanization products were determined in the same manner as in Examples 1 to 6. Results of determination are given in the following Table 15.

TABLE 15

|  | Comp. Ex. 1 | Comp. Ex. 2 | Comp. Ex. 3 |
|---|---|---|---|
| <Properties of unvulcanized compositions> | | | |
| Mooney viscosity ($ML_{1+4}$, M) | 57 | 49 | 49 |
| Scorch time (min.) | 23.0 | 16.0 | 11.9 |
| <Vulcanization product properties> | | | |
| Normal state physical properties | | | |
| Hardness (JIS-A, pts) | 75 | 70 | 69 |
| 100% Modulus ($kg/cm^2$) | 52 | 46 | 52 |
| Breaking strength ($kg/cm^2$) | 125 | 155 | 150 |
| Breaking elongation (%) | 220 | 310 | 250 |
| Resistance to heat ageing | | | |
| Hardness change (%) | +7 | +3 | +7 |
| Breaking strength change (%) | −4 | −2 | −2 |
| Breaking elongation change (%) | +1 | −4 | −6 |
| Compression set (%) | 40 | 28 | 25 |

COMPARATIVE EXAMPLES 4 TO 9

Acrylic rubber compositions were prepared from the polymer E, according to formulations given in the following Table 16 by kneading in an 8-inch open roll.

TABLE 16

| | Comparative Examples | | | | | |
|---|---|---|---|---|---|---|
| | 4 | 5 | 6 | 7 | 8 | 9 |
| Polymer E | 100 | 100 | 100 | 100 | 100 | 100 |
| HAF carbon black (N330) | 60 | 60 | 60 | 60 | | 60 |
| FEF carbon black (N550) | | | | | 65 | |
| Stearic acid | 1 | 1 | 1 | 1 | 1 | 1 |
| 4,4'-($\alpha,\alpha$-dimethylbenzyl)-diphenylamine | 2 | 2 | 2 | 2 | 2 | 2 |
| Plasticizer (fatty acid metal salt) | | | | | 10 | |
| Sodium stearate | 3 | 3 | 3 | 3 | 2.5 | |
| Potassium stearate | 0.25 | 0.25 | 0.25 | 0.25 | 0.5 | |
| Sulfur | 0.3 | 0.3 | 0.3 | 0.3 | 0.3 | |
| Trithiocyanuric acid | | | | | | 0.5 |
| Zinc di-n-butylthio-carbamate*[7] | | | | | | 1.5 |
| Dodecyl acrylate | | 2 | | | | |
| Tetradecadiene | | | 2 | | | |
| Dodecane | | | | 2 | | |

Remarks
*[7]Knoccelar BZ trademark of a vulcanization accelerator made by Ouchi-Shinko Kagaku Kogyo K. K., Japan Properties of the thus obtained unvulcanized compositions and properties, resistance to heat ageing and compression set of the resulting vulcanization products were determined in the same manner as in Examples 1 to 6. Results of determination are given in the following Table 17.

TABLE 17

| | Comparative Examples | | | | | |
|---|---|---|---|---|---|---|
| | 4 | 5 | 6 | 7 | 8 | 9 |
| <Properties of unvulcanized compositions> | | | | | | |
| Mooney viscosity ($ML_{1+4}$, M) | 56 | 41 | 49 | 54 | 38 | 48 |
| Scorch time (min.) | 17.4 | 19.6 | 15.0 | 18.1 | 8.6 | 8.3 |
| <Vulcanization product properties> | | | | | | |
| Normal state physical properties | | | | | | |
| Hardness (JIS-A, pts) | 67 | 59 | 66 | 66 | 58 | 65 |
| 100% Modulus (kg/cm$^2$) | 65 | 40 | 58 | 60 | 39 | 70 |
| Breaking strength (kg/cm$^2$) | 144 | 139 | 143 | 144 | 109 | 123 |
| Breaking elongation (%) | 180 | 250 | 220 | 200 | 272 | 170 |
| Resistance to heat ageing | | | | | | |
| Hardness change (%) | +8 | +13 | +12 | +8 | +5 | +12 |
| Modulus change (%) | −5 | +17 | +6 | −4 | −8 | +14 |
| Breaking strength change (%) | −8 | −15 | −2 | −7 | −8 | 0 |
| Breaking elongation change (%) | +6 | −8 | −5 | +2 | −10 | +6 |
| Compression set (%) | 35 | 21 | 23 | 39 | 45 | 16 |
| <Other influences of unsaturated compounds> | | | | | | |
| Unpleasant odor | observed | | none | | none | |
| Skin irritation | observed | | none | | none | |
| Deterioration of mold releasability | observed | | none | | none | |

As injection moldability judging from mold dirt by attachment of tailings, the following results are obtained:

TABLE 18

| Examples | Attachment of tailings |
|---|---|
| Example 1 | ○ |
| Example 4 | Δ |
| Example 5 | ○ |
| Example 7 | ○ |
| Example 13 | ○ |
| Example 16 | Δ |
| Example 17 | ○ |
| Example 19 | ○ |
| Example 25 | ○ |
| Example 28 | Δ |
| Example 29 | ○ |
| Example 31 | ○ |
| Example 37 | ○ |
| Example 40 | Δ |
| Example 41 | ○ |
| Example 43 | ○ |
| Example 49 | ○ |
| Example 52 | Δ |
| Example 53 | ○ |
| Example 55 | ○ |
| Comp. Ex. 9 | X |

What is claimed is:

1. An acrylic rubber composition, which comprises a halogen-containing acrylic rubber, a vulcanizing agent and at least one unsaturated compound selected from the group consisting of (1) carboxylic acid vinyl esters, (2) alkyl vinyl ethers, (3) lower alkyl cyclohexenes or cyclohexenecarboxylic acid caprolactone esters and (4) unsaturated dicarboxylic acid dialkyl or dialkenyl diesters wherein the alkyl group or the alkenyl group has 1–10 carbon atoms,
wherein the halogen-containing acrylic rubber is comprised of a copolymer of alkyl acrylate, as a main component, or alkyl acrylate and alkoxyalkyl acrylate, as main components, copolymerized with about 0.1 to about 10% by weight of a cross-linking site, halogen-containing monomer, based on the copolymer and
wherein the vulcanizing agent is selected from the group consisting of an aliphatic acid alkali metal salt/sulfur, trithiocyanuric acid/aliphatic acid alkali metal salt and a diamine or diamine carbamate/dibasic lead phosphite.

2. An acrylic rubber composition according to claim 1, wherein the halogen-containing acrylic rubber is a halogen- and carboxyl group-containing acrylic rubber.

3. An acrylic rubber composition according to claim 1, wherein the carboxylic acid vinyl esters are unsaturated compounds represented by the general formula $RCOOCH=CH_2$, where R is an alkyl group having 1 to 20 carbon atoms or an aryl group.

4. An acrylic rubber composition according to claim 1, wherein the alkyl vinyl ethers are unsaturated compounds represented by the general formula $ROCH=CH_2$, where R is an alkyl group having 3 to 18 carbon atoms.

5. An acrylic rubber composition according to claim 1, wherein the lower alkyl cyclohexenes are cyclohexene derivatives, at least one of whose hydrogen atoms at 3-, 4-, 5- or 6-positions excluding the unsaturated bond is replaced with a lower alkyl group having 1 to 5 carbon atoms.

6. An acrylic rubber composition according to claim 1, wherein the lower alkyl cyclohexenes are cyclohexene derivatives, at least one of whose hydrogen atoms at 3-, 4-, 5- or 6-positions excluding the unsaturated bond is replaced with a lower alkyl group having 1 to 5 carbon atoms substituted by a lower alkoxy group having 1 to 5 carbon atoms.

7. An acrylic rubber composition according to claim 1, wherein the cyclohexenecarboxylic acid caprolactone esters are cyclohexene derivatives having a caprolactone ester group represented by the general formula —COO[(CH$_2$)$_5$COO]$n$CH$_2$R at the 3-position, where R is an alkyl group having 1 to 8 carbon atoms, an alkoxyl group, an alkoxyalkyl group or a cyclohexenyl group and n is an integer of 1 to 5.

8. An acrylic rubber composition according to claim 1, wherein the unsaturated dicarboxylic acid diesters are esters having two alkyl groups or two alkenyl groups, each group having 1 to 10 carbon atoms.

9. An acrylic rubber composition according to claim 1, wherein about 0.1 to about 30 parts by weight of the unsaturated compound is contained per 100 parts by weight of the halogen-containing acrylic rubber.

10. An acrylic rubber composition according to claim 1, wherein a plasticizer is further contained.

* * * * *